(12) United States Patent
Suzuki

(10) Patent No.: US 9,844,847 B2
(45) Date of Patent: Dec. 19, 2017

(54) MACHINE TOOL, PARTITION DEVICE AND ROBOT SYSTEM PROVIDED WITH PARTITION MEMBER COVERING A PART OF OPENING OF COVER

(71) Applicant: FANUC CORPORATION, Minamitsuru-gun, Yamanashi (JP)

(72) Inventor: Ryuuji Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/213,773

(22) Filed: Jul. 19, 2016

(65) Prior Publication Data

US 2017/0021467 A1 Jan. 26, 2017

(30) Foreign Application Priority Data

Jul. 24, 2015 (JP) .................................. 2015-146790

(51) Int. Cl.
  *B23Q 11/08* (2006.01)
  *B23Q 7/04* (2006.01)
  *B25J 9/16* (2006.01)

(52) U.S. Cl.
  CPC ............ *B23Q 11/0891* (2013.01); *B23Q 7/04* (2013.01); *B23Q 11/0825* (2013.01); *B25J 9/1679* (2013.01)

(58) Field of Classification Search
  CPC .. B23Q 11/0891; B23Q 7/04; B23Q 11/0825; B23Q 11/0866; B25J 9/1679; B25J 9/1687; B65G 47/905; Y10S 901/41

USPC .............................................. 700/249; 901/41
See application file for complete search history.

(56) References Cited

U.S. PATENT DOCUMENTS

| | | | | |
|---|---|---|---|---|
| 4,741,232 A | * | 5/1988 | Myers | B23Q 1/015 29/27 C |
| 4,870,592 A | * | 9/1989 | Lampi | G05B 19/4189 29/38.9 |
| 9,530,676 B2 | * | 12/2016 | Yokoyama | H01L 21/6704 |
| 9,669,506 B2 | * | 6/2017 | Maerzinger | B23Q 1/66 |
| 2010/0092273 A1 | * | 4/2010 | Oda | B23Q 7/005 414/728 |
| 2014/0012420 A1 | * | 1/2014 | Yasue | G05B 19/18 700/264 |
| 2014/0286734 A1 | * | 9/2014 | Oda | B25J 9/16 414/222.01 |

FOREIGN PATENT DOCUMENTS

| | | |
|---|---|---|
| JP | 02004739 | 1/1990 |
| JP | 2002370136 | 12/2002 |
| JP | 2003245841 | 9/2003 |
| JP | 2006255845 | 9/2006 |
| JP | 2012076212 | 4/2012 |
| JP | 2014054676 | 3/2014 |
| JP | 2014-205231 A | 10/2014 |

* cited by examiner

*Primary Examiner* — Bao Long T Nguyen
(74) *Attorney, Agent, or Firm* — RatnerPrestia

(57) ABSTRACT

A machine tool can prevent cutting fluid or the like, which has occurred within a cover, from leaking out through an opening when a door provided in the cover is open. The machine tool includes a door for opening and closing an opening provided in a cover for defining a work space, and a partition member which is attached, as a member separated from the door, to the cover and which shields a part of the opening to define a small opening smaller than the opening.

5 Claims, 8 Drawing Sheets

MACHINE TOOL, PARTITION DEVICE AND ROBOT SYSTEM PROVIDED WITH PARTITION MEMBER COVERING A PART OF OPENING OF COVER

BACKGROUND OF THE INVENTION

1. Field of the Invention

The invention relates to a machine tool, a partition device, and a robot system, provided with a partition member for shielding a part of an opening provided in a cover for defining a work space.

2. Description of the Related Art

Machine tools provided with a cover for defining a work space for machining an object, and a door which can open and close an opening formed in the cover have been known (see, for example, Japanese Unexamined Patent Publication (Kokai) No. 2014-205231).

In the machine tools, various kinds of objects having various sizes can be machined. In order to accept such various kinds of objects, in general, the opening formed in the cover is set to have relatively large sizes.

When such a relatively large opening is formed in the cover, cutting fluid or the like occurring on the inside of the cover tends to easily leak out through the opening when the door is open. Further, outside air tends to easily enter the inside of the workspace through the opening when the door is open. When the outside air enters the inside of the workspace in such a manner, the temperature of the machine tool tends to vary, and accordingly, the machining accuracy is rendered unstable in some cases.

SUMMARY OF THE INVENTION

In an aspect of the invention, a machine tool includes a door which opens and closes an opening formed at a cover defining a work space, and a partition member which is a member different from the door and which is attached to the cover. The partition member covers a part of the opening so as to define a small opening smaller than the opening.

The partition member may be provided to be able to move relative to a wall surface which defines the opening so as to change the size of the small opening. The machine tool may further include a guide which guides the movement of the partition member. The partition member may slide along the guide.

The machine tool may include a plurality of partition members movable relative to each other. The machine tool may include a first partition member and a second partition member movably attached to the first partition member.

In another aspect of the invention, a partition device, which is a member different from a door opening and closing an opening formed at a cover defining a work space of a machine tool and which is attached to the cover, includes a partition member which covers a part of the opening so as to define a small opening smaller than the opening. The partition member is provided so as to be able to move relative to a wall surface which defines the opening so as to change the size of the small opening.

The partition device further includes a guide which guides the movement of the partition member. The partition member may slide along the guide. The partition device may include a plurality of partition members movable relative to each other. The partition device may include a first partition member and a second partition member movably attached to the first partition member.

In still another aspect of the invention, a robot system includes the above-mentioned machine tool, a robot provided to be able to enter and retract from the work space when the door is opened, and a controller which controls the operation of the robot so as to move the partition member by the robot.

The partition member may be formed with a recess, a protrusion, or a hole. The robot may include an engagement part able to engage the recess, the protrusion, or the hole. The controller may operate the robot so as to move the partition member when the engagement part engages the recess, the protrusion, or the hole.

BRIEF DESCRIPTION OF THE DRAWINGS

The above-mentioned or other objects, features and advantages of the invention will be clarified by the detailed description of exemplary embodiments with reference to the accompanying drawings, in which.

DETAILED DESCRIPTION

Figure 1:
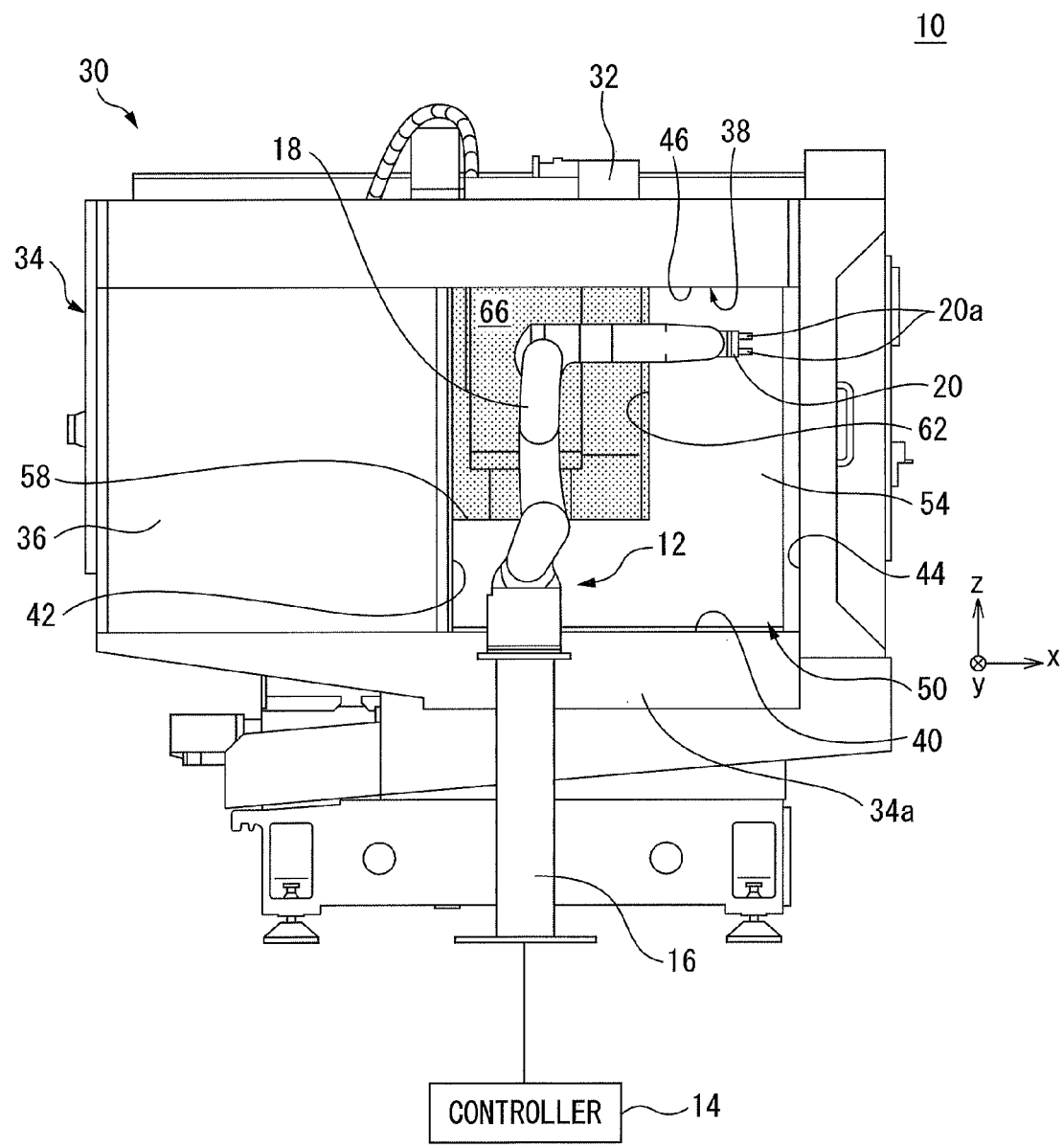
FIG. 1 is a view of a robot system according to an embodiment of the invention.

Embodiments of the invention will be described below in detail with reference to the drawings. First, with reference to FIG. 1, a robot system 10 according to an embodiment of the invention will be described. Note that, in the following description, the x-axis positive direction, the y-axis positive direction, and the z-axis positive direction in the orthogonal coordinate system in the drawings are respectively referred as the rightward direction, the frontward direction, and the upward direction, for convenience.

The robot system 10 includes a robot 12, a controller 14, and a machine tool 30. The robot 12 is e.g. a vertical multi-articulated robot, and includes a base 16 fixed on a floor of a work cell, a robot arm 18 rotatably connected to the base 16, and a robot hand 20 provided at the distal end of the robot arm 18.

The robot hand 20 includes claws 20a, is able to grip or release an article, such as a workpiece or tool, etc. The robot hand 20 is moved by the operation of the robot arm 18. The controller 14 directly or indirectly controls each component of the robot 12.

The machine tool 30 includes a processing machine 32, a cover 34, a door 36, and a partition device 50. The processing machine 32 is for machining a workpiece (not shown), such as a turning machine, a drilling machine, or a milling machine.

The cover 34 is disposed so as to surround the processing machine 32, and defines a work space inside thereof. The cover 34 prevents liquid, such as cutting fluid, generated in the work space during the process by the processing machine 32 from scattering to the outside.

The cover 34 includes a rear wall 34a facing the robot 12 and an opening 38 formed at the rear wall 34a. In this embodiment, the rear wall 34a is provided so as to be substantially parallel to the x-z plane in the drawings. The opening 38 is defined by four wall surfaces formed at the rear wall 34a, and has a quadrangular shape.

More specifically, the opening 38 is defined by a bottom wall surface 40 extending in the right-left direction (i.e., horizontal direction), a left wall surface 42 extending upward from the left edge of the bottom wall surface 40, a right wall surface 44 extending upward from the right edge of the bottom wall surface 40, and an upper wall surface 46 extending between the left wall surface 42 and the right wall surface 44 so as to be substantially parallel with the bottom wall surface 40.

The door 36 is mounted at the rear wall 34a of the cover 34 so as to be able to move rightward and leftward, and can open and close the opening 38. Note that, in FIG. 1, the door 36 is arranged at the left end of the movement stroke thereof, thereby the opening 38 is opened.

When the door 36 is arranged at the right end of the movement stroke thereof, the opening 38 is fully closed. The door 36 is moved leftward and rightward by a door driving unit (not shown), such as a servo motor or an air cylinder.

The robot 12 is disposed to be adjacent to the rear wall 34a of the cover 34, and can enter and retract from the work space through the opening 38 when the door 36 is opened, in accordance with a command from the controller 14.

Thereby, the robot 12 can carry an object gripped by the robot hand 20 into the work space and place it on a predetermined position, and can grasp the object placed in the work space and remove it therefrom.

Next, the partition device 50 will be described with reference to FIGS. 1 to 3. The partition device 50 is a member different (separated) from the door 36, and is detachably attached to an inner surface 34b (FIG. 2) of the rear wall 34a of the cover 34. The partition device 50 includes a frame 52 and a partition member 54.

The frame 52 is detachably attached to the rear wall 34a of the cover 34 by a fastener, such as a bolt. The partition member 54 is fixed to the frame 52. The partition member 54 is formed with a rectangular hole 56.

The hole 56 is defined by four wall surfaces formed at the partition member 54. Specifically, the hole 56 is defined by a bottom wall surface 58 extending in the horizontal direction, a left wall surface 60 extending upward from the left edge of the bottom wall surface 58, a right wall surface 62 extending upward from the right edge of the bottom wall surface 58, and an upper wall surface 64 extending between the left wall surface 60 and the right wall surface 62 so as to be substantially parallel with the bottom wall surface 58.

Figure 2:
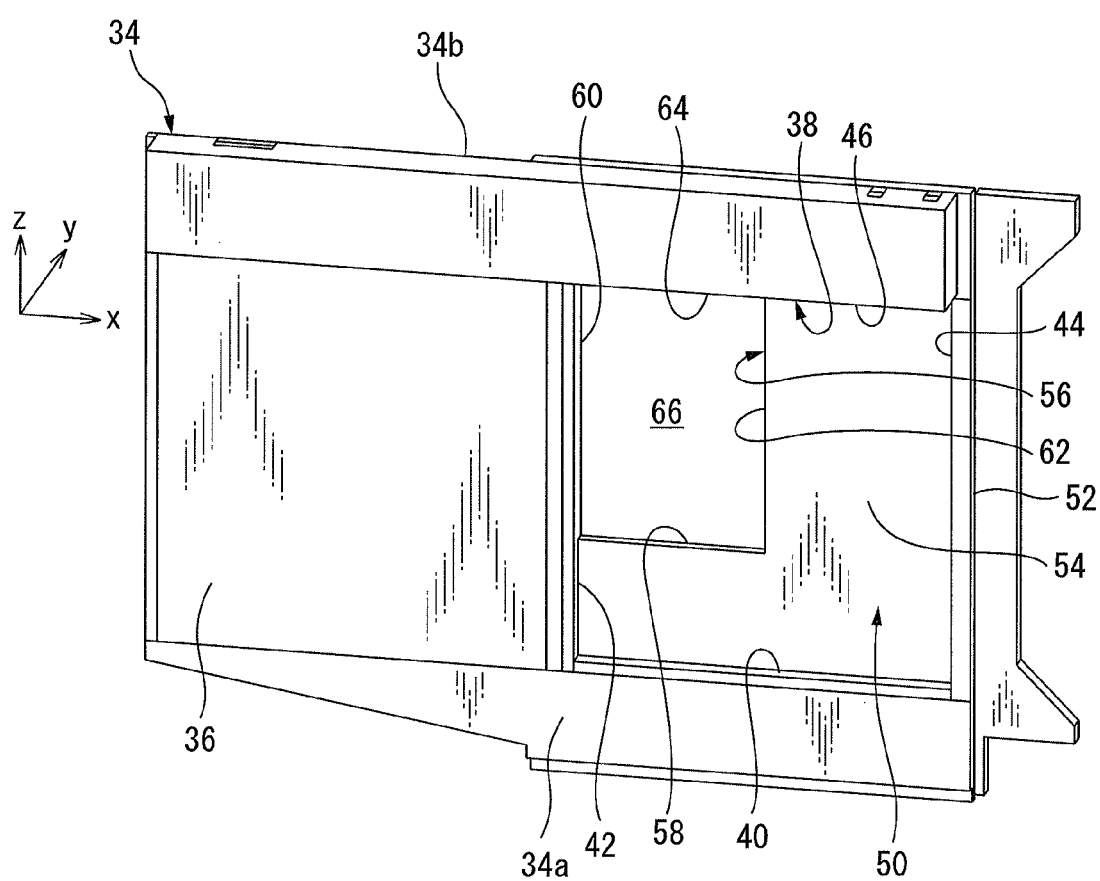
FIG. 2 is an enlarged perspective view of a main part of the machine tool shown in in FIG. 1.
Figure 3:
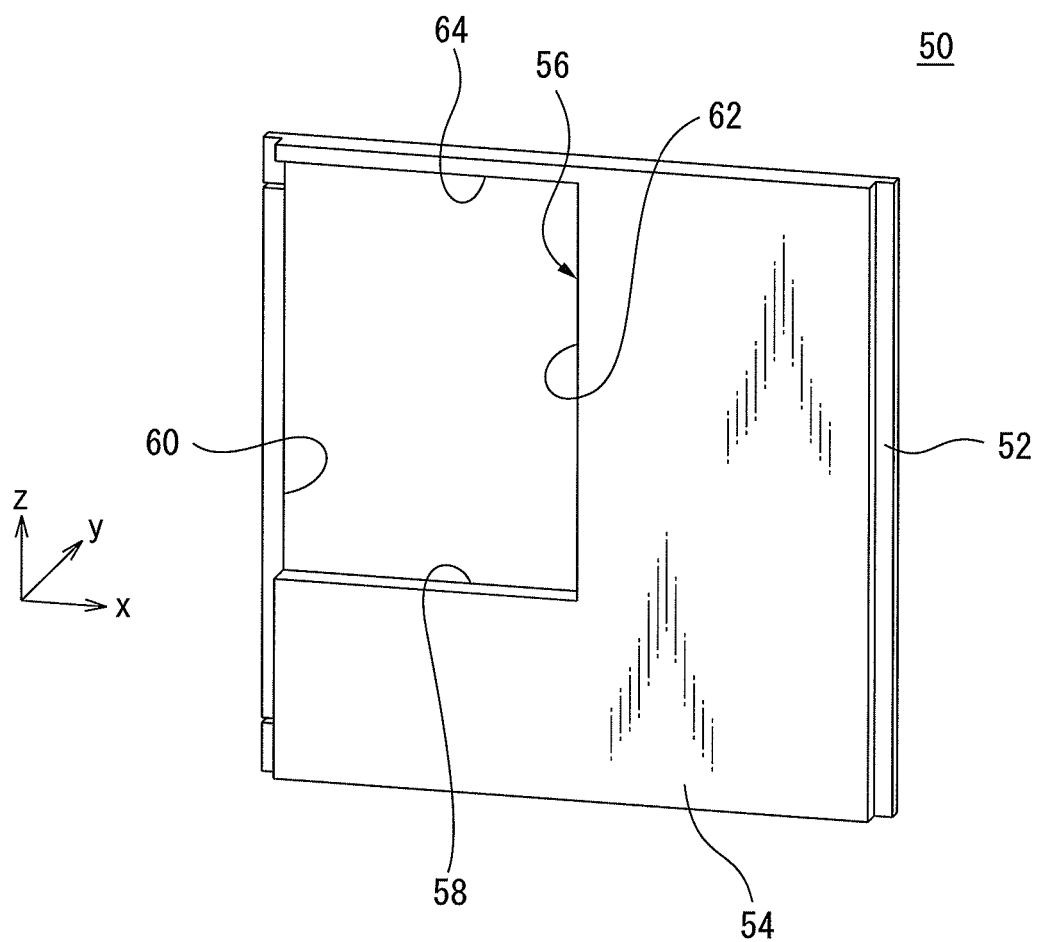
FIG. 3 is a perspective view of the partition device shown in FIG. 2.

As shown in FIGS. 1 and 2, when the partition device 50 is attached to the cover 34, the partition member 54 covers a part of the opening 38 of the cover 34, and defines a small opening 66 smaller than the opening 38.

Specifically, the small opening 66 is defined by the bottom wall surface 58 and the right wall surface 62 which define the hole 56, and by the left wall surface 42 and the upper wall surface 46 which define the opening 38. Note that, the left wall surface 60 and the upper wall surface 64 which define the hole 56 of the partition device 50 may be arranged on substantially the same plane as the left wall surface 42 and the upper wall surface 46 which define the opening 38, respectively.

When the robot 12 carries into or removes from the work space an object such as a workpiece in this embodiment, the robot 12 enters or retracts from the work space through the small opening 66. The size of the small opening 66 is appropriately set depending on e.g. the size of the object to be carried into or removed from the work space, the path of movement of the object, or the position at which the object is placed in the work space.

For example, the size of the small opening 66 is set as small as possible unless the object or the robot 12 interferes with the cover 34 or the partition member 54 when the robot 12 carries into or removes from the work space the object.

Thus, in this embodiment, the partition member 54 defines the small opening 66 which is smaller than the opening 38 to a degree that the operation of the robot 12 to carry in or remove the object is not disturbed.

According to this configuration, it is possible to reduce the amount of leakage of cutting fluid, etc. present in the work space which leaks out to the outside when the door 36 is opened for carriage or removal of the object. Due to this, it is possible to prevent the surrounding environment from being influenced by the cutting fluid, etc., which leaks out when the door 36 is open.

Further, the amount of air to be introduced into the work space when the door 36 is open can be reduced. Accordingly, it is possible to prevent the temperature of the processing machine from changing due to the outside air introduced into the work space, thereby prevent the machining accuracy from being unstable.

Further, the partition device 50 has a simple structure without a drive unit such as a servo motor, and a user can easily attach/detach the partition device 50 to/from the cover 34 in response to a kind of work. Therefore, it is possible to achieve the advantageous effect of preventing the leakage of cutting fluid etc. or introduction of outside air, with a lower cost.

Next, a partition device 70 according to another embodiment will be described with reference to FIG. 4. The partition device 70 can be applied to the machine tool 30 shown in FIG. 1, instead of the above-mentioned partition device 50.

The partition device 70 includes a frame 72 and a partition member 74. The frame 72 includes a lower guide 76, a left column 78, a right column 80, and an upper guide 82. The lower guide 76 is a rod member in the horizontal direction.

Figure 4:
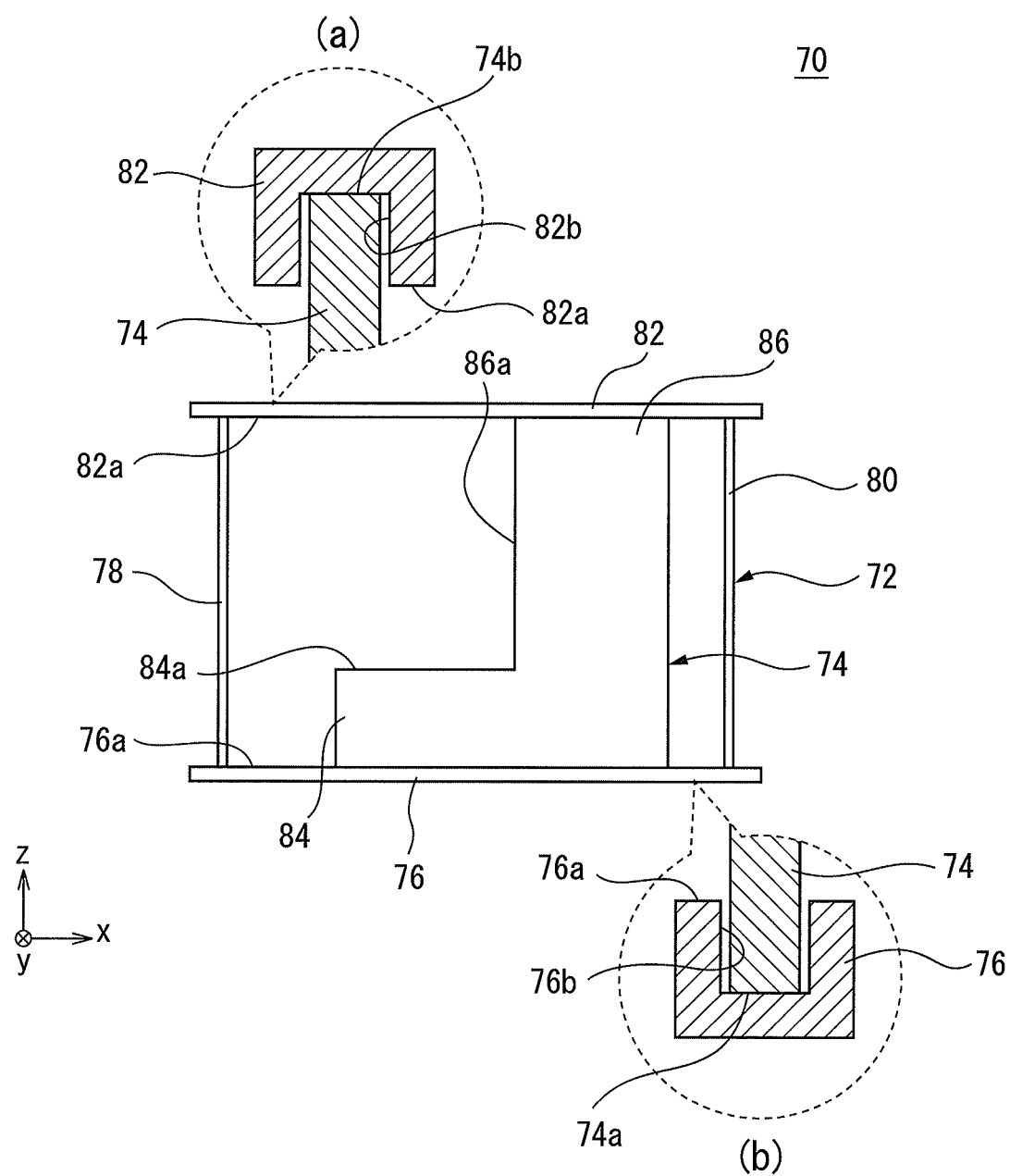
FIG. 4 is a view of a partition device according to another embodiment of the invention, in which area (a) shows a cross-sectional view of an upper guide while area (b) shows a cross-sectional view of a lower guide.

As shown in area (b) in FIG. 4, the lower guide 76 is formed with a recess 76b recessed inward from a top surface 76a of the lower guide 76. A bottom end 74a of the partition member 74 is slidably received in the recess 76b.

The left column 78 is a rod member extending upward from the left end of the lower guide 76 so as to be connected to the upper guide 82. The right column 80 is a rod member extending upward from the right end of the lower guide 76 so as to be substantially parallel with the left column 78 and connected to the upper guide 82.

The upper guide 82 is a rod member extending so as to be substantially parallel with the lower guide 76. The upper guide 82 has a configuration similar to the lower guide 76. Specifically, as shown in area (a) in FIG. 4, the upper guide 82 is formed with a recess 82b recessed inward from a bottom surface 82a of the upper guide 82. A top end 74b of the partition member 74 is slidably received in the recess 82b.

The partition member 74 is a plate member having a substantially L-shaped profile. Specifically, the partition member 74 includes a first plate 84 extending in the horizontal direction, and a second plate 86 extending upward from the right end of the first plate 84.

A top end surface 84a of the first plate 84 extends in the horizontal direction, while a left end surface 86a of the second plate 86 extends in the upper-lower direction (i.e., vertical direction). The top surface 84a and the left end surface 86a are perpendicular to each other.

The partition member 74 is guided by the lower guide 76 and the upper guide 82 so as to be able to slide leftward and rightward along the lower guide 76 and the upper guide 82 between the left column 78 and the right column 80.

Next, the function of the partition device 70 will be described with reference to FIGS. 4 and 5. The partition device 70 is attached to the inner surface 34b of the rear wall 34a of the cover 34 shown in FIG. 1, instead of the above-mentioned partition device 50.

Figure 5:
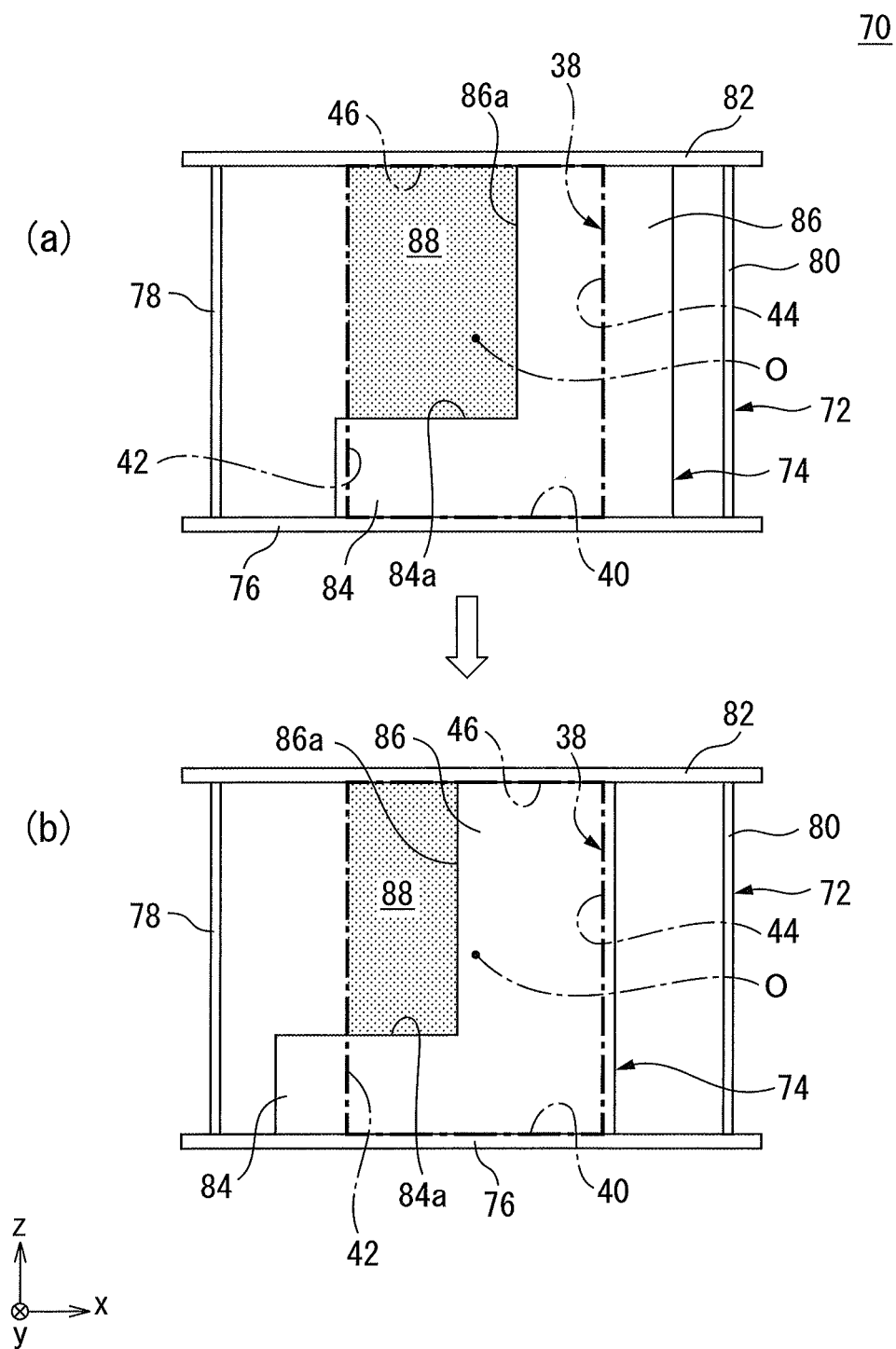
FIG. 5 is a view for explaining the movement of the partition device shown in FIG. 4.

Note that, a dashed-dotted line in FIG. 5 indicates the outer edge of the opening 38 formed at the cover 34. When the partition device 70 is attached to the rear wall 34a of the cover 34, the partition member 74 covers a part of the opening 38 of the cover 34 so as to define a small opening 88 smaller than the opening 38, as shown in FIG. 5.

Specifically, the small opening 88 is defined by the top end surface 84a of the first plate and the left end surface 86a of the second plate 86 of the partition member 74, and by the left wall surface 42 and the upper wall surface 46 which define the opening 38.

As described above, the partition member 74 can slide leftward and rightward along the lower guide 76 and the, upper guide 82. Accordingly, the partition member 74 can move relative to wall surfaces 40, 42, 44, and 46 which define the opening 38.

In other words, the partition member 74 can move relative to a central axis O of the opening 38. Note that, in this embodiment, the central axis O is defined as an axis extending in the front-rear direction.

The size of the small opening 88 varies depending on the right-left movement of the partition member 74. For example, if the partition member 74 is moved leftward from the position shown in area (a) of FIG. 5 to the position shown in area (b) of FIG. 5, the size of the small opening 88 reduces in response to this leftward movement of the partition member 74.

Thus, in this embodiment, since the partition member 74 can move relative to the wall surfaces 40, 42, 44, and 46 of the opening 38, a user can appropriately adjust the size of the small opening 88 depending on e.g. the size of an object, such as a workpiece, etc.

Accordingly, the user can easily adjust the size of the small opening 88 to be smaller to a degree that the robot 12 can carry in or remove the object without any interference. Accordingly, it is possible to effectively reduce the amount of leakage of the cutting fluid etc. which leaks out when the door 36 is open.

Further, the amount of air to be introduced into the work space when the door 36 is open can be effectively reduced. Therefore, it is possible to prevent the machining accuracy from being unstable due to the outside air introduced into the work space. Further, since the partition device 70 has a simple structure, it is possible to achieve the advantageous effect of preventing the leakage of cutting fluid, etc., or the introduction of outside air, at a lower cost.

Figure 7:
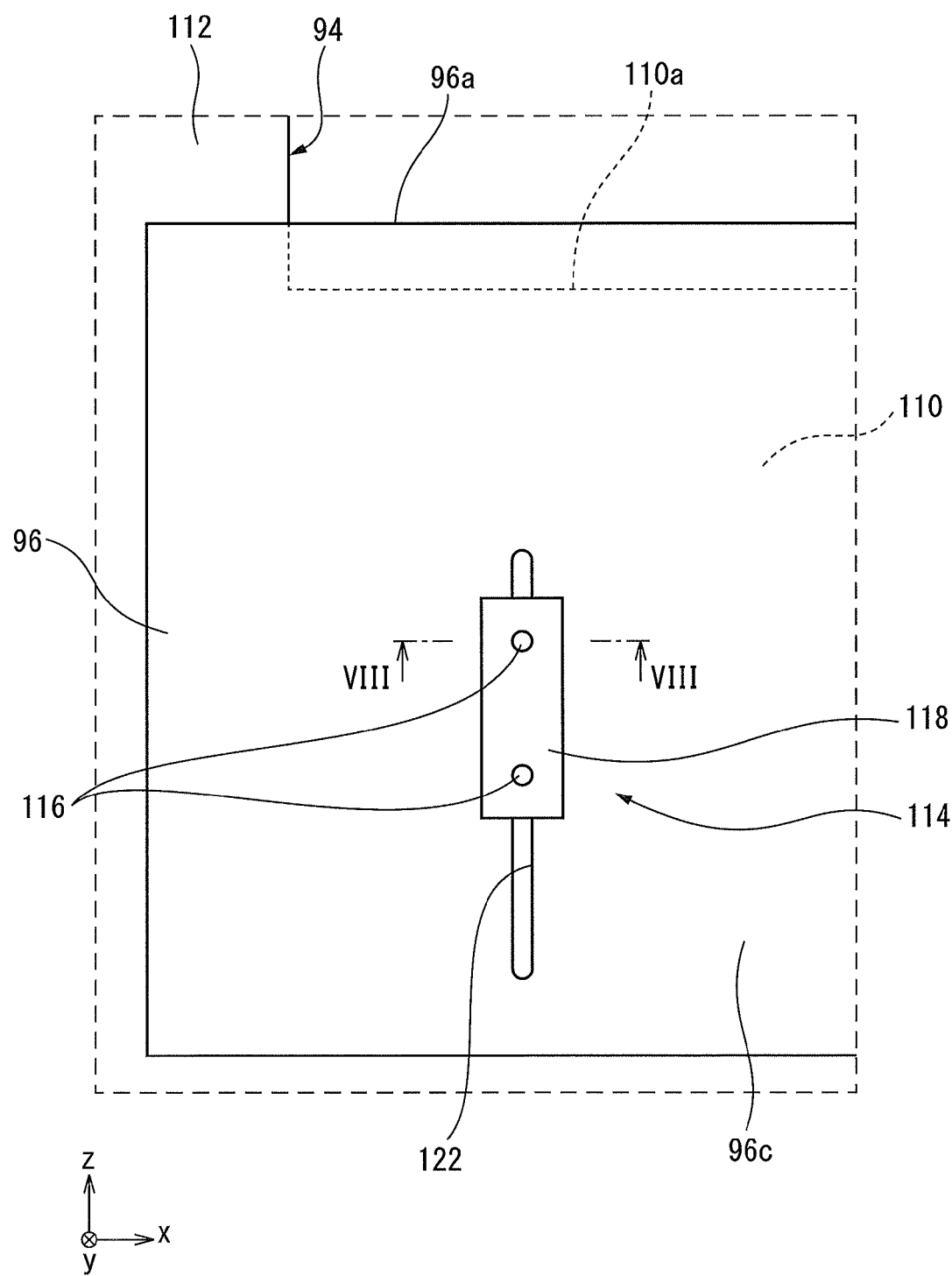
FIG. 7 is an enlarged view of area VII indicated by a two-dot chain line in FIG. 6
Figure 8:
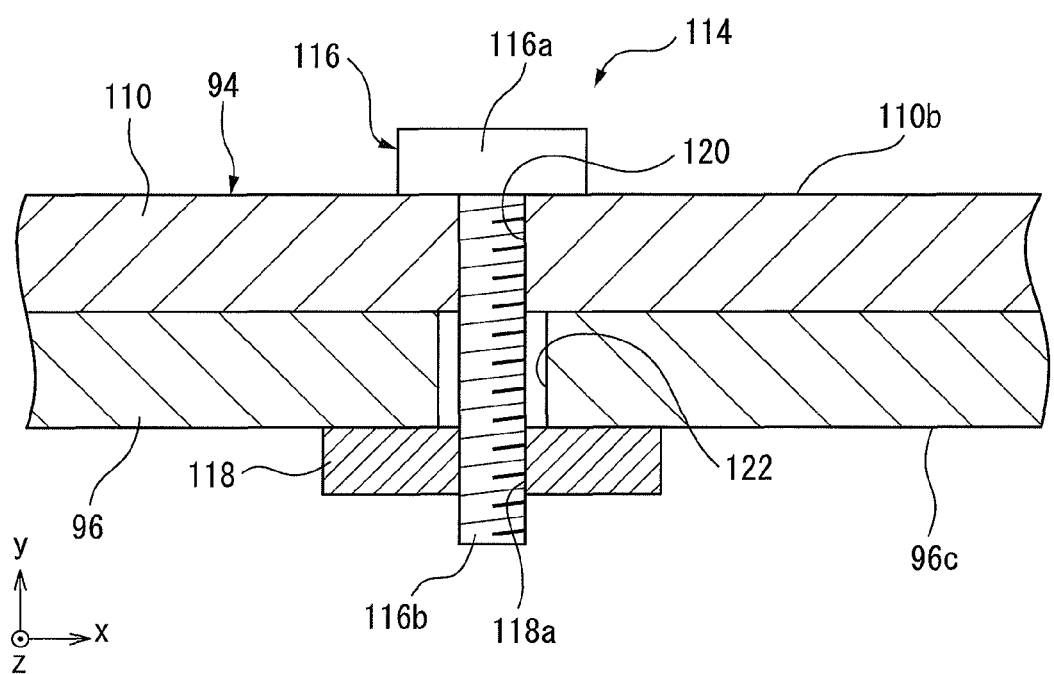
FIG. 8 is a cross-sectional view along line VIII-VIII in FIG. 7.

Next, a partition device 90 according to still another embodiment will be described with reference to FIGS. 6 to 8. The partition device 90 can be applied to the machine tool 30 shown in FIG. 1, instead of the above-mentioned partition device 50.

The partition device 90 includes a frame 92 and a plurality of partition members 94, 96, 98, and 100. The frame 92 has a configuration similar to the above-mentioned frame 72. Specifically, the frame 92 includes a lower guide 102, a left column 104, a right column 106, and an upper guide 108.

The lower guide 102 is a rod member extending in the horizontal direction, and is formed with a recess (not shown) recessed inward from a top surface 102a of the lower guide 102. The left column 104 is a rod member extending upward from the left end of the lower guide 102. The right column 106 is a rod member extending upward from the right end of the lower guide 102 so as to be substantially parallel with the left column 104.

The upper guide 108 is a rod member extending between the left column 104 and the right column 106 so as to be substantially parallel to the lower guide 102. The upper guide 108 is formed with a recess (not shown) recessed inward from a bottom surface 108a of the upper guide 108.

The partition member 94 is a plate member having a substantially L-shaped profile, and its bottom end (not shown) is slidably received in the recess formed at the lower guide 102, while its top end (not shown) is slidably received in the recess formed at the upper guide 108. Thus, the partition member 94 is guided by the lower guide 102 and the upper guide 108 so as to be able to slide leftward and rightward.

The partition member 94 includes a first plate 110 extending in the horizontal direction, and a second plate 112 extending upward from the left end of the first plate 110. A top end surface 110a of the first plate 110 extends in the horizontal direction, while a right end surface 112a of the second plate 112 extends in the vertical direction, thereby the top end surface 110a and the right end surface 112a are perpendicular to each other. A through-hole 112b is formed at the second plate 112.

The partition member 96 is a substantially rectangular plate member, and is arranged rearward of the partition member 94 so as to adjoin the partition member 94. A top end surface 96a of the partition member 96 is arranged to be substantially parallel to the top surface 110a of the first plate 110 of the partition member 94. A through-hole 96b is formed at the partition member 96.

The partition member 96 (second partition member) is movably attached to the partition member 94 (first partition member) via a total of two fastening mechanisms 114. The fastening mechanisms 114 will be described below with reference to FIGS. 7 and 8. Each fastening mechanism 114 includes fasteners 116 and a holding plate 118.

Each fastener 116 is e.g. a bolt, and includes a head 116a which engages a front surface 110b of the first plate 110 of the partition member 94, and a shaft 116b extending from the head 116a. The surface of the shaft 116b is threaded.

The holding plate 118 is a substantially rectangular plate member, and contacts a rear surface 96c of the partition member 96. The holding plate 118 is formed with threaded holes 118a. The shafts 116b of the fasteners 116 can be respectively screwed in the threaded holes 118a.

The first plate 110 of the partition member 94 is formed with through-holes 120, each of which having a shape corresponding to each shaft 116b. On the other hand, the partition member 96 is formed with a slit 122 formed to extend in the vertical direction. The slit 122 has a width in the horizontal direction which is larger than that of the shaft 116b of the fasteners 116. The shafts 116b are slidably received in the slit 122.

The shafts 116b of the fasteners 116 pass through the through-holes 120 of the first plate 110 and the slit 122 of the partition member 96, and are screwed in the threaded holes 118a of the holding plate 118, respectively. Due to this, the partition members 94 and 96 are held between each head 116a of each fastener 116 and the holding plate 118 so as to be coupled to each other.

Note that, the fastening force for fastening the fasteners 116 to the holding plate 118 is adjusted so that a frictional force, which allows a user to move the partition member 96 relative to the partition member 94 and to stop the partition member 96 at an arbitrary position on the partition member 94, is generated between the partition member 94 and the partition member 96.

For example, if a user applies a predetermined upward force to the partition member 96, the partition member 96 can move upward relative to the partition member 94. At this time, the shafts 116b of the fasteners 116 relatively slide in the slit 122 with engaging the slit 122.

By the engagement between each shaft 116b and the slit 122, the movement of the partition member 96 relative to the partition member 94 is guided. Thus, the slit 122 functions as a guide which guides the movement of the partition member 96.

By the fastening mechanisms 114 described above, the partition member 96 is attached to the partition member 94 so as to move along the slit 122 (i.e., move in the vertical direction). In addition, the user can stop the partition member 96 at any position in the movement stroke thereof which corresponds to the length of the slit 122.

Referring again to FIG. 6, the partition member 98 is a plate member having an L-shaped profile, and is arranged frontward of the partition member 94 so as to adjoin the partition member 94. The bottom end (not shown) of the partition member 98 is slidably received in the recess formed at the lower guide 102.

On the other hand, the top end (not shown) of the partition member 98 is slidably received in the recess formed at the upper guide 108. Due to this, the partition member 98 is guided by the lower guide 102 and the upper guide 108 so as to be able to slide leftward and rightward.

The partition member 98 includes a first plate 124 extending in the horizontal direction, and a second plate 126 extending downward from the right end of the first plate 124. A bottom end surface 124a of the first plate 124 extends in the horizontal direction, while a left end surface 126a of the second plate 126 extends in the vertical direction, thereby the bottom end surface 124a and the left end surface 126a are perpendicular to each other. A through-hole 126b is formed at the second plate 126.

The partition member 100 is a substantially rectangular plate member, and is arranged frontward of the partition member 98 so as to adjoin the partition member 98. A bottom end surface 100a of the partition member 100 is arranged to be substantially parallel to the bottom end surface 124a of the first plate 124 of the partition member 98. A through-hole 100b is formed at the partition member 100.

The partition member 100 (second partition member) is movably attached to the partition member 98 (first partition member) via the above-mentioned fastening mechanism 114. Specifically, the first plate 124 of the partition member 98 is formed with through-holes (not shown), each of which has a shape corresponding to the shaft 116b of each fastener 116. On the other hand, the partition member 100 is formed with a slit 128 extending in the vertical direction.

The shafts 116b of the fasteners 116 are slidably received in the slit 128. The slit 128 functions as a guide for guiding the movement of the partition member 100, similar as the function of the above-mentioned slit 122.

The partition member 100 is attached to the partition member 98 via the fastening mechanism 114, so as to be movable along the slit 128 (i.e., in the vertical direction). In addition, the user can stop the partition member 100 at any position in its movement stroke.

Next, the function of the partition device 90 will be described with reference to FIG. 6. The partition device 90 is attached to the inner surface 34b of the rear wall 34a of the cover 34 shown in FIG. 1, instead of the partition device 50.

Figure 6:
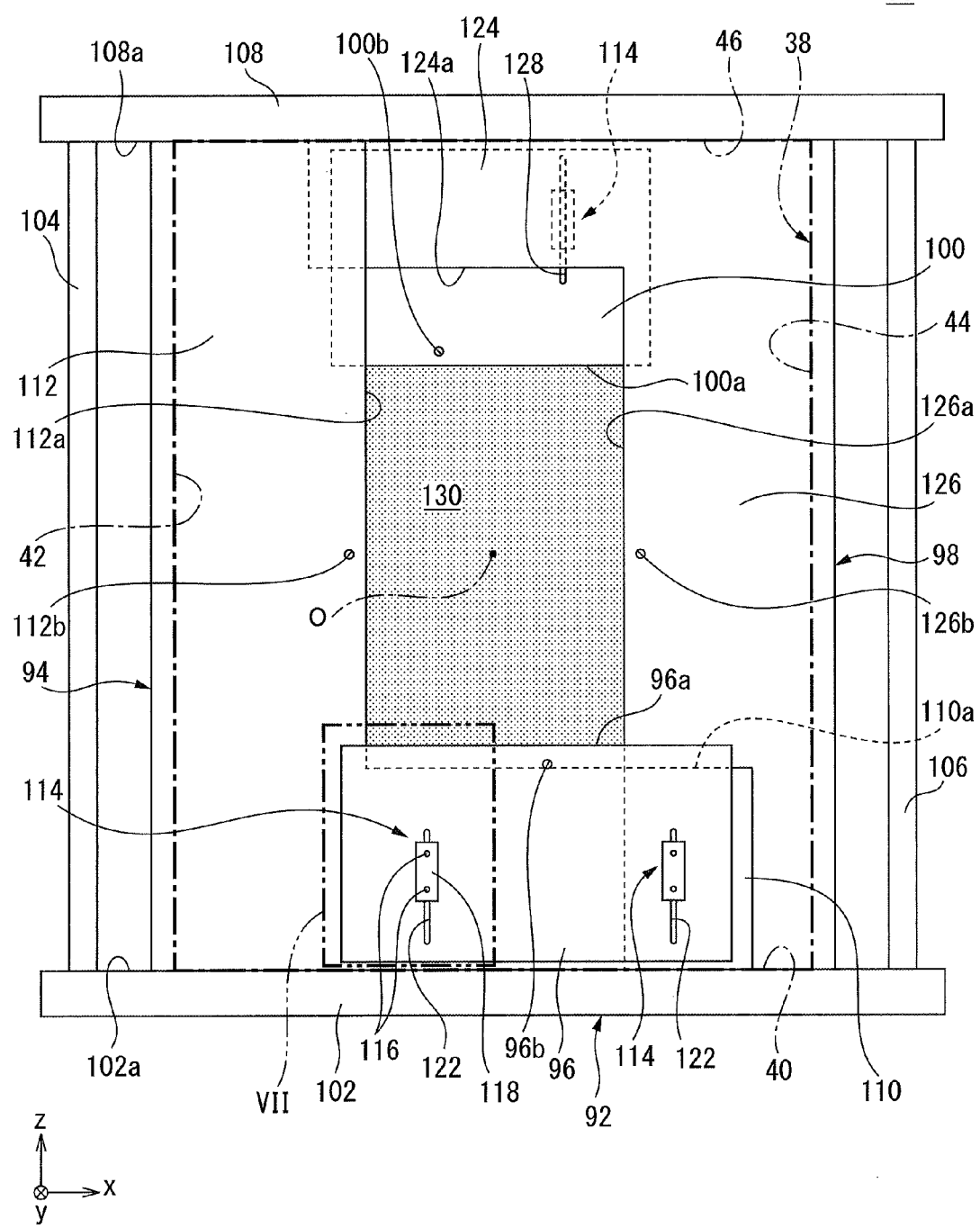
FIG. 6 is a view of a partition device according to still another embodiment of the invention.

Note that, the dashed-dotted line in FIG. 6 indicates the outer edge of the opening 38 formed at the cover 34. When the partition device 90 is attached to the rear wall 34a of the cover 34, the partition members 94, 96, 98, and 100 cooperatively cover a part of the opening 38 of the cover 34 so as to define a small opening 130 smaller than the opening 38, as shown in FIG. 6.

Specifically, the small opening 130 is defined by the right end surface 112a of the partition member 94, the top end surface 96a of the partition member 96, the left end surface 126a of the partition member 98, and the bottom end surface 100a of the partition member 100.

As described above, the partition member 94 can slide leftward and rightward along the lower guide 102 and the upper guide 108. Accordingly, the partition member 94 can move relative to the wall surfaces 40, 42, 44, and 46 which define the opening 38. In other words, the partition member 94 can move with respect to the central axis O of the opening 38 of the cover 34.

Similarly, the partition member 98 can also slide leftward and rightward along the lower guide 102 and the upper guide 108. Accordingly, the partition member 98 can move relative to the wall surfaces 40, 42, 44, and 46 (or central axis O) of the opening 38 of the cover 34.

As the partition members 94 and 98 move in the horizontal direction, the right end surface 112a of the partition member 94 and the left end surface 126a of the partition member 98 approach or separate away from each other. Due to this, the width in the horizontal direction of the small opening 130 decreases or increases.

On the other hand, the partition member 96 can slide upward and downward relative to the partition member 94 along the slit 122. Accordingly, the partition member 96 can move relative to the wall surfaces 40, 42, 44, and 46 (or the central axis O) of the opening 38 of the cover 34.

Further, the partition member 100 can slide upward and downward relative to the partition member 98 along the slit 128. Accordingly, the partition member 100 can move relative to the wall surfaces 40, 42, 44, and 46 (or the central axis O) of the opening 38 of the cover 34.

As the partition members 96 and 100 move upward and downward, the top surface 96a of the partition member 96 and the bottom surface 100a of the partition member 100 approach or separate away from each other. Due to this, the height in the vertical direction of the small opening 130 decreases or increases.

Thus, along with the movements of the partition members 94, 96, 98, and 100, the size of the small opening 130 varies. Accordingly, the user can appropriately adjust the size of the small opening 130 by moving at least one of the partition members 94, 96, 98, and 100.

Due to this, the user can easily adjust the size of the small opening 130 to be smaller to a degree that the robot 12 can carry in or remove the object without any interference. Accordingly, it is possible to effectively reduce the amount of leakage of the cutting fluid etc. which leaks out when the door 36 is open.

Further, since the amount of air to be introduced into the work space when the door 36 is open can be effectively reduced, it is possible to effectively prevent the machining accuracy from being unstable due to the outside air introduced into the work space. Further, since the partition device 90 has a simple structure, it is possible to achieve the advantageous effect of preventing the leakage of cutting fluid etc. or the introduction of outside air, with a lower cost.

Note that, if the partition device 90 shown in FIG. 6 is applied to the machine tool 30 shown in FIG. 1, the partition members 94, 96, 98, and 100 can be moved by the robot 12.

Below, an example of an operation of the robot system 10 in such a case will be described. First, the controller 14 acquires information of an object, such as a workpiece to be machined, from a user, host controller, or robot program.

Then, the controller 14 determines the size of the small opening 130 based on the acquired information of the object. Then, the controller 14 determines target positions of the partition members 94, 96, 98, and 100, which correspond to the determined size of the small opening 130.

Then, the controller 14 reads out from a storage the 3D coordinates of the through-hole 112b of the partition member 94 at the present time. Then, the controller 14 compares the read-out 3D coordinates of the through-hole 112b at the present time with the 3D coordinates of the through-hole 112b corresponding to the target position thereof, and determines a direction and amount of movement by which the partition member 94 should be moved.

Then, the controller 14 operates the robot arm 18 and the robot hand 20 based on the 3D coordinates of the through-hole 112b at the present time, so as to engage the claws 20a provided at the robot hand 20 with the through-hole 112b.

Then, the controller 14 moves the partition member 94 while the claws 20a engage the through-hole 112b based on the determined direction and amount of movement, so as to position the partition member 94 at the target position thereof. Thus, in this embodiment, the claws 20a functions as an engagement part which engages the through-hole 112b of the partition member 94.

Along with moving the partition member 94, the controller 14 successively calculates the 3D coordinates of the through-hole 112b of the partition member 94 and the through-hole 96b of the partition member 96, and stores them in the storage.

Then, the controller 14 reads out from the storage the 3D coordinates of the through-hole 96b of the partition member 96 at the present time. Then, the controller 14 compares the read-out 3D coordinates of the through-hole 96b at the present time with the 3D coordinates of the through-hole 96b corresponding to the target position thereof, and determines a direction and amount of movement by which the partition member 96 should be moved.

Then, the controller 14 operates the robot arm 18 and the robot hand 20 based on the 3D coordinates of the through-hole 96b at the present time, so as to engage the claws 20a of the robot hand 20 with the through-hole 96b.

Then, the controller 14 moves the partition member 96 while the claws 20a engage the through-hole 112b based on the determined direction and amount of movement, so as to position the partition member 96 at the target position thereof.

In accordance with a similar scheme, the controller 14 moves the partition members 98 and 100 to the corresponding target positions, respectively. In this way, the size of the small opening 130 can be adjusted by the robot 12.

According to this configuration, it is possible to automatically change the size of the small opening 130 by the robot 12 in response to e.g. the size of an object such as a workpiece, without additionally providing a drive unit for moving the partition members 94, 96, 98, and 100. Thereby, the operation can be simplified and quickly performed.

In the above-mentioned embodiment shown in FIG. 6, the through-holes 112b, 96b, 126b, and 100b are respectively formed at the partition members 94, 96, 98, and 100. However, a recess or protrusion may be formed instead of each of the through-holes 112b, 96b, 126b, and 100b.

Figure 9:
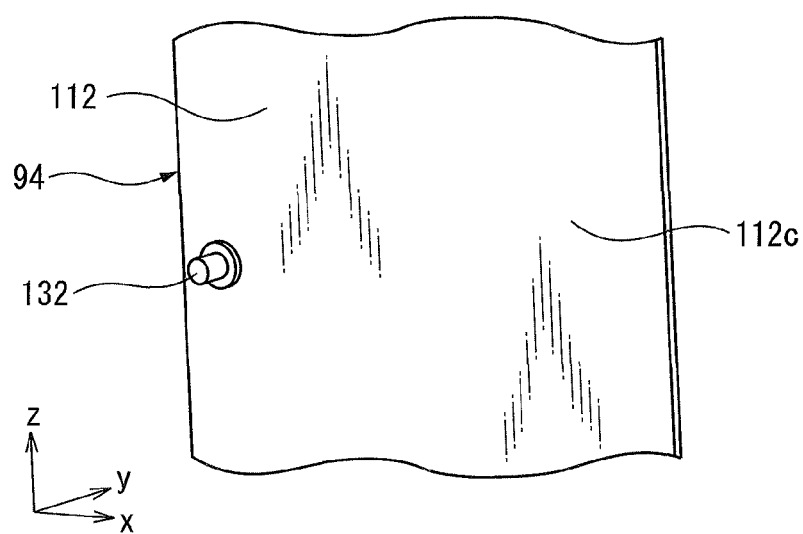
FIG. 9 is a view of a variation of the partition member shown in FIG. 6.

FIG. 9 shows an embodiment in which the second plate 112 of the partition member 94 is formed with a protrusion 132 projecting rearward from a rear surface 112c of the second plate 112, instead of the through-hole 112b.

Note that, if the partition device 70 shown in FIG. 4 is applied to the robot system 10 shown in FIG. 1, the partition member 74 can be moved by the robot 12 in accordance with a scheme similar to the above-mentioned scheme. In this case, the partition member 74 may be formed with a recess, protrusion, or hole to be engaged with the claws 20a of the robot hand 20.

Further, the partition devices 50, 70, and 90 may be directly attached to the cover 34, or may be indirectly attached to the cover 34 via other tool, such as an attachment.

Further, in the above-mentioned embodiment, each fastening mechanism 114 is comprised of the fasteners 116 and the holding plate 118. However, the fastening mechanism may have any configuration which allows the relative movement of the partition member 96, 100. For example, the fastening mechanism may include a guide rail and a roller which rolls on the guide rail.

Further, in the above-mentioned embodiments, the fastening mechanism 114 generates a frictional force which enables the partition member 96, 100 to stop at an arbitrary position. However, a locking mechanism for holding the partition member 96, 100 at an arbitrary position may be further provided, without generating the above-mentioned frictional force at the fastening mechanism 114.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for means for solving the invention. Furthermore, it is obvious for a person skilled in the art that various modifications or improvements can be applied to the embodiments.

Regarding the order of operations, such as actions, sequences, steps, processes, and stages, in the devices, systems, programs, and methods indicated in the claims, specification and drawings, it should be noted that the terms "before", "prior to", etc., are not explicitly described, and any order can be realized unless the output of a previous operation is used in the subsequent operation. Regarding the operation flows in the claims, specification, and drawings, even when the order of operations is described using the terms "first", "next", "subsequently", "then", etc., for convenience, maintaining this order is not necessarily essential for working the inventions.

The invention claimed is:

1. A robot system comprising:
a machine tool comprising:
- a door which opens and closes an opening formed at a cover defining a work space; and
- a partition member which is a member different from the door and which is attached to the cover, the partition member covering a part of the opening so as to define a small opening smaller than the opening, the partition member configured to move relative to a wall surface defining the opening so as to change a size of the small opening;
- a robot configured to enter and retract from the work space when the door is opened; and
- a controller which controls the operation of the robot so as to move the partition member by the robot.

2. The machine tool according to claim 1, further comprising a guide which guides the movement of the partition member, wherein the partition member slides along the guide.

3. The robot system according to claim 1, wherein the machine tool comprises a plurality of partition members movable relative to each other.

4. The robot system according to claim 3, wherein the machine tool comprises:
- a first partition member; and
- a second partition member movably attached to the first partition member.

5. The robot system according to claim 1, wherein the partition member is formed with a recess, a protrusion, or a hole, wherein
the robot includes an engagement part able to engage the recess, the protrusion, or the hole, and wherein
the controller operates the robot so as to move the partition member when the engagement part engages the recess, the protrusion, or the hole.

* * * * *